July 13, 1926.
V. P. GAMBOA
1,592,485
OPERATING MEANS FOR STATION INDICATORS
Filed March 12, 1925   2 Sheets-Sheet 1
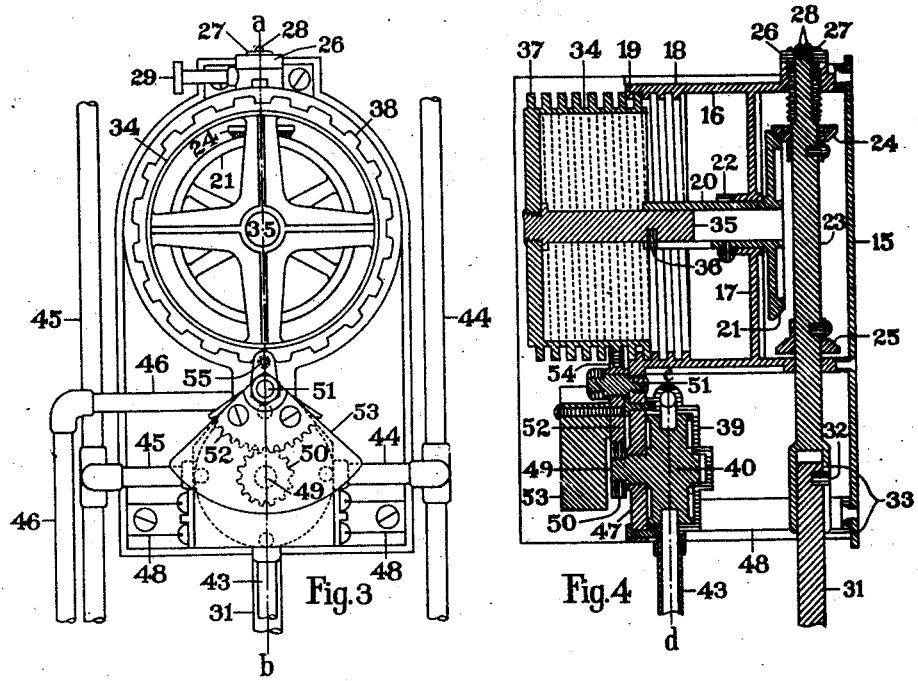
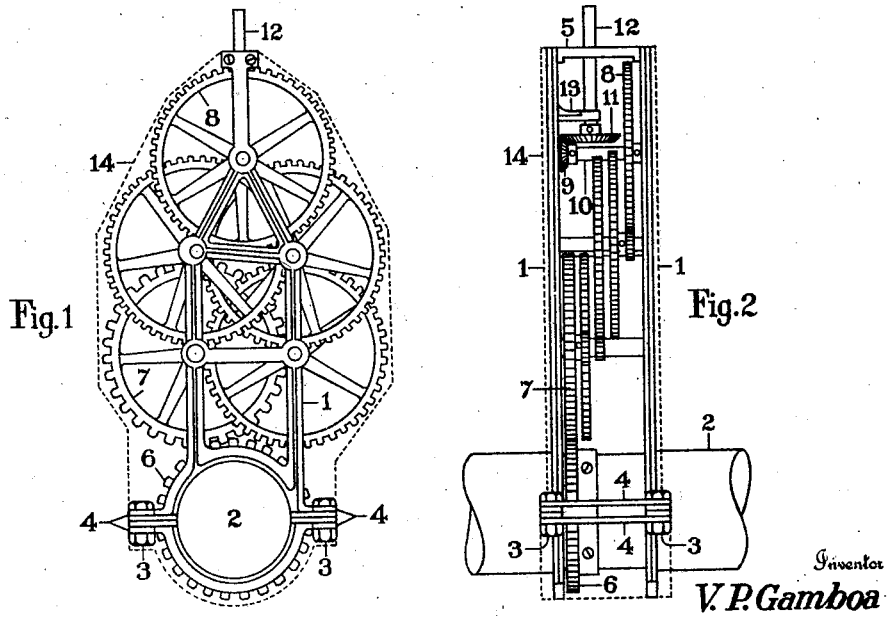
Inventor
V. P. Gamboa
By
Attorney July 13, 1926.
V. P. GAMBOA
1,592,485
OPERATING MEANS FOR STATION INDICATORS
Filed March 12, 1925    2 Sheets-Sheet 2
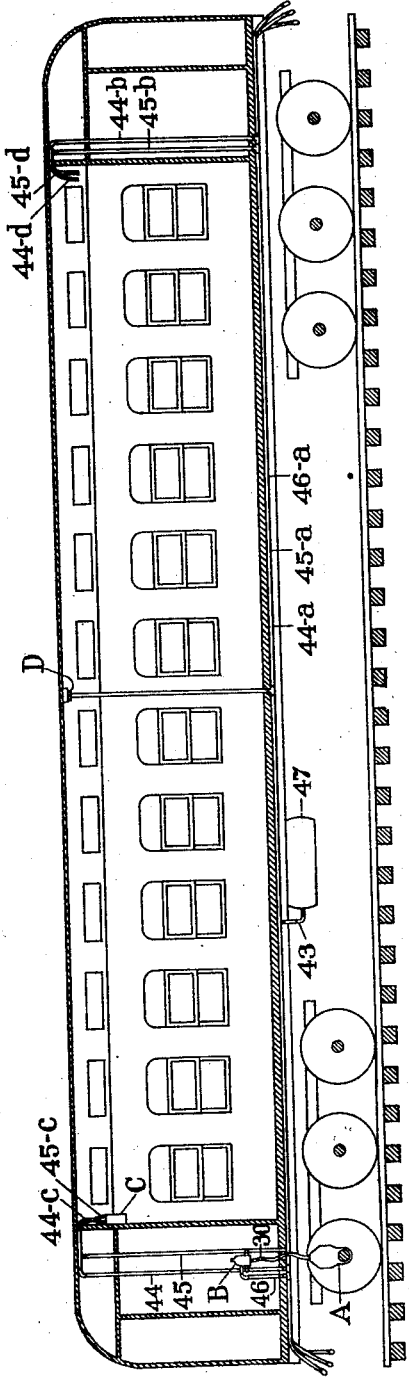
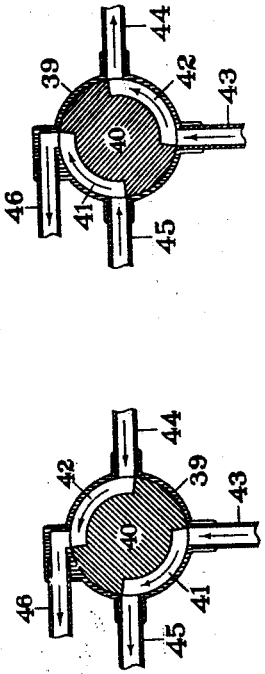
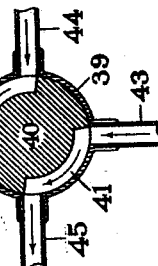
Inventor
V. P. Gamboa Patented July 13, 1926.

1,592,485

UNITED STATES PATENT OFFICE.

VICENTE PERALES GAMBOA, OF CHICAGO, ILLINOIS.

OPERATING MEANS FOR STATION INDICATORS.

Application filed March 12, 1925. Serial No. 15,013.

This invention relates to a means for periodically controlling a fluid under pressure for the operation of a station indicator on passenger carriers.

In an application filed by me in the United States Patent Office on the 18th of September, 1924, Serial No. 738,477 I have described a station indicator operated primarily by air under pressure, with the admission of such air to the indicator proper controlled by an air distributor which is set for operation and operated through the provision of track instrumentalities located in predetermined relation to the stations on the line of travel.

The present invention is directed to providing a means for operating and controlling the air distributor with a view to making the apparatus self-contained and wholly free of any track-carried elements. Broadly, the operating means for the air distributor is actuated by the axle of a car of the train, which, through reduction gearing, compels the actuation in a selected direction of a controlling drum having an exteriorly helically disposed rib, proportionately constructed in operative length with the track length between terminal stations, with such rib interrupted at points proportionally corresponding to the respective stations whose names are to appear on the indicator. A trip member operated in succession by these interruptions correspondingly shifts the cut-off to admit air pressure in the proper direction for governing the indicator proper.

The invention is illustrated in the accompanying drawings, in which:

Fig. 1 is a view in side elevation of the gearing operated by the axle of the car.

Fig. 2 is an end elevation of the same, the cover casing being shown in dotted outline.

Fig. 3 is a front elevation of the controlling drum, trip member, and air pipes.

Fig. 4 is a vertical sectional view of the same through the line $a$—$b$.

Figs. 5 and 6 are similar sectional views of the cut-off through the line $c$—$d$, showing respectively relatively reversed positions thereof.

Fig. 7 is a view in section of a car illustrating the relative arrangements of the various parts of the complete station indicator apparatus.

The improved cut-off operating means, with which this application is more particularly concerned, includes spaced frames 1 having split bearing sections to be mounted around an axle 2 of the truck wheels, bolts 3 and tie links 4 and 5 holding the frames in rigid spaced relation. A driving gear 6, preferably formed in halves, is rigidly secured to the axle 2 and operates through reduction gearing indicated generally at 7 to drive the final gear 8 at a reduced speed. A bevel pinion 9 is secured upon the shaft 10 of the gear 8 and meshes with a bevel pinion 11 secured upon the lower end of an operating shaft 12, rotatably supported in the link 5 and in a bracket 13 secured to one of the frames. The operating mechanism described is preferably inclosed in a dust-proof casing 14, shown in dotted outline.

The controlling mechanism forming part of the operating means includes a base 15, suitably mounted on an appropriate part of the car structure, from which base extends a cylindrical member 16, having an interior partition 17, formed with a central bearing opening, the interior surface 18 of the member 16 being thickened adjacent the free edge thereof and formed with threads 19. Mounted in the bearing opening of the partition 17, is a hollow shaft 20, which on one side of the partition is formed with a bevel gear 21, a collar 22 engaging the bearing opening in the partition 17 in opposition to the gear to hold the shaft 20 against other than rotative movement. A drive shaft 23 is mounted for rotation and relative longitudinal adjustment in partitions of the controlling mechanism, and on this shaft are fixed opposing bevel pinions 24 and 25, either of which, by longitudinal adjustment of the shaft, may be caused to engage with and actuate the bevel gear 21, thereby permitting selection as to the direction in which the bevel gear 21 is operated.

The upper end of the shaft 23 extends through a threaded nipple having connection with an appropriate enlargement of the upper supporting partition and terminating in a knurled disc head 26. The shaft passes through this head and is provided at its upper end with an enlarged washer 27 bearing on the head and secured by screws 28 to the shaft. Obviously, by turning the knurled head 26, shaft 23 may be adjusted longitudinally to bring either pinion 24 or 25 into driving cooperation with the gear 21. A set screw 29 maintains the adjusted position of the shaft. The shaft 23 is operated from the shaft 12 through the medium of a flexible shaft section 30 (see Fig. 7) terminating in a rigid section 31 which seats in a hollow enlargement at the lower end of the shaft 23 and is provided with a pin 32 cooperating with a longitudinal slot 33 in the enlargement. Thus the driving action is maintained while free adjustability is permitted the shaft 23.

A drum 34 is mounted for cooperation with the cylindrical member 16, this drum having a spoked outer end and being open at the inner end. The drum has an axial rod 35 which slidably seats in the hollow shaft 20, and is held against independent rotation therein and at the same time permitted independent longitudinal movement through a pin and slot connection indicated at 36. The drum is exteriorly formed or provided with a rib 37 arranged in the form of a solenoid or thread for cooperation with the threaded formation 19 of the member 18, so that as the bevel gear 21 is operated, the drum is gradually fed into or out of the member 18, in accordance with the direction of rotation of such gear. The rib 37, aside from the initial turns thereof necessary to maintain the cooperation of the drum and cylindrical member 18, is of a length bearing a direct proportion to the length of trackage between the terminal stations of the car's travel. This rib 37 is interrupted by depressions or cut out portions at determinate intervals, thereby providing a series of projections 38 which will be hereinafter termed trip projections. The successive projections are spaced apart a distance corresponding to the distance between successive stations on the particular trackway, this spacing having of course the proportion to the actual distance between stations as the full length of the operative phase of the rib has to the total length of the trackway. Thus there is a trip projection for each station throughout the length of trackway being covered, and these trip projections serve, in a manner now to be described, to control the operation of the air distributor of the indicator.

The air distributor shown more particularly in Figs. 5 and 6, comprises a casing 39 in which is mounted a cut-off 40 in the form of a cylinder recessed at diametrically opposed portions to form channels 41 and 42. Pipe sections 43, 44, 45, and 46, lead from the casing 39, through appropriately formed ports. The pipe 43 serves as an inlet to admit air from a suitable pressure tank 47 carried on the car; the pipes 44 and 45 serve as service pipes to permit air under pressure from the pipe 43 to be delivered to the indicator proper for the successive operation thereof; while the pipe 46 serves as an exhaust of the indicator pressure, and, as described in the application above referred to, serves to deliver the exhaust air to the audible alarm for attracting attention to the change of indicator. Thus with the position of the cut-off indicated in Fig. 5, the service pressure will be delivered to the indicator through the pipe 45, and exhausted from the indicator through the pipe 44; while in the reverse position of the cut-off, the service pressure is delivered through pipe 44 and exhausted through pipe 45. The cut-off has thus two operative positions, and it is to operate such cut-off to these positions in succession that the trip projections are provided.

The casing 39 is mounted adjacent a fixed partition 47, (see Figs. 3 and 4) supported by two arms 48 from the base 15 of the controlling mechanism, a shaft 49 of such cut-off being mounted in the partition and in the casing and provided on one side thereof with a fixed pinion 50. A trip member is swingingly supported upon a pin 51 threaded into the partition 47 above the pinion 50, the lower portion of this trip member being in the form of a gear segment 52 directly cooperating with the pinion 50. A weight 53 is secured to the segment to normally maintain the trip member in vertical position. That portion of the trip member above the pivot pin 51 is formed as spaced plates 54 adapted to receive the rib 37 between them, a roller 55 being mounted between these plate portions to permit each trip projection 38 to move the trip member laterally and thereby through the segment 52 and pinion 50 swing the cut-off to one position. As the trip projection passes by the roller, the trip member returns to normal position by means of the weight 53, thus moving the cut-off to the remaining position.

The controlling mechanism hereindescribed is inclosed in a dust-proof boxing 56, having its front wall as a hingedly door to permit access to the interior.

From the application above referred to, it will be understood that the respective positions of the cut-off are for the purpose of controlling the admission of air under pressure to the indicator proper, one such position causing the admission of air to operate the indicator tape to display the name of the next station, the other position admitting air under pressure to operate means for concealing the name of the station disclosed. Thus the positions of the cut-off are both active so far as the operation of the indicator is concerned but only one of such positions directly actuates the tape for the display of the name of the station. With the present construction, it is designed that the swinging of the trip member through appropriate cooperation therewith of a trip projection so operates the cut-off as to advance the names bearing tape to display the name of the station being approached, the reverse position of the cut-off due to the return of the trip member to normal position under the action of the weight, serving to admit air to the indicator to operate the means for concealing the name of the station just displayed. As the drive shaft 23 is longitudinally adjustable to control the direction of feed of the controlling drum, it is first necessary to adjust the shaft to operate the gear 21 in the proper direction. As the car moves along the track, the reduction gearing is operated, and the controlling drum 34 turned on its axis and by reason of the threaded rib fed into or out of the member 18, the extent of movement of the drum presenting to the trip member a length of rib 37 proportional to the full length of the trackway traveled by the car. As each station is approached, the trip projection of the drum rib operates the trip member, with the effect to move the cut-off and direct the air under pressure to the indicator proper for the purposes of moving the indicating tape and displaying the name of the station being approached. As the particular trip projection rides by the trip member, the weight returns the trip member to normal position, the cut-off is operated through the reverse position, the concealing means of the indicator is operated, and the parts are ready to display the name of the next station being approached, as the car nears such station.

Obviously, the drum may be fed in either direction in accordance with the adjustment of the shaft 23, so that with the apparatus described, when the train reaches the terminal station and the parts are to be adjusted for the return trip, if the particular car is not turned for such return trip but merely travels in the reverse direction, no setting is necessary, as the reverse movement of the car axle provides the necessary reverse movement of the parts. If, however, the car is turned for the reverse travel, the brakeman or other authorized person will simply adjust the shaft 23 to cause driving cooperation of the previously idle pinion 24 or 25 as the case may be, and thus secure the necessary reverse movement of the parts.

In order to provide an application of the mechanism which will best serve the convenience of the passengers on the car, it is preferable, though such forms no particular part of the present invention, to have the indicator proper movable from one end of the coach to the other, so that passengers can get the indication right at front, in both directions the coach travels. It is also a matter of convenience to have the audible alarm secured to the middle part of the coach, so that people sitting at the ends can get a loud calling of attention. In the case of a group of coaches forming a train, it would be advisable to apply the operating device but in one of them and to extend the piping through the rest of the passenger coaches, which means considerable economy in the passenger trains.

On account of all these reasons combined, the most convenient installation system would be the one illustrated in Fig. 7, in which A is the speed reducer, B is the air distributing means, C is the indicator proper, and D is the audible alarm. The inlet pipe 43 receives the air from the reservoir 47, goes by beneath the floor, and through it, to connect with the air distributor B. The feeding pipes 44 and 45 go upward to connect with the indicator C and extend downward through the floor to connect with the transcoach pipes 44$^a$ and 45$^a$. At the opposite end of the coach, branches 44$^b$ and 45$^b$ derive from 44$^a$ and 45$^a$, and go upwardly through the floor to connect with the same indicator C when changed to this opposite end of the coach. Rubber hose sections 44$^c$, 45$^c$, 44$^d$ and 45$^d$, are provided to facilitate easy and quick connections to the indicator, by means of pressure brooch unions secured to the ends of these hoses. The outlet pipe 46 bends down and goes through the floor to connect with the transcoach outlet pipe 46$^a$. At the middle of the coach a branch pipe 46$^b$ derives from 46$^a$ and goes upward, through the floor, to connect with the audible alarm D. All three transcoach pipes 44$^a$, 45$^a$, and 46$^a$, are provided with rubber hose sections 44$^d$, 45$^d$ and 46$^d$, to connect by well known means with the respective transcoach pipes of the coach or coaches next to the one having the indicator operating means. It will be of course apparent that but little pressure is necessary to operate the parts of the indicator, hence the pipes of the system can be of a very small caliber.

What I claim is:

1. A station indicator to be operated by compressed air, a cut-off for controlling the admission of air to such indicator, and means directly operated by a moving part of the vehicle on which the indicator is mounted for periodically and directly operating the cut-off.

2. The combination with a passenger car, of an air operated station indicator thereon, a cut-off for controlling the air admission to the indicator, means operated by the car axle, and mechanism connected to the cut-off and directly operated by said means for actuating the cut-off.

3. The combination with a passenger car, of an air operated station indicator thereon, a cut-off for controlling the air admission to the indicator, means operated by the axle, and an operator directly secured to the cut-off and immediately actuated by said means.

4. An air operated station indicator, a cut-off for controlling the admission of air thereto, a controlling drum to be operated in the movement of a passenger vehicle, and a member connected to the cut-off and directly operated by the drum for periodically actuating the cut-off.

5. A station indicator, a cut-off for controlling the admission of an operating medium thereto, a drum to be operated in the movement of a vehicle, a rib on said drum having a length proportioned to the length of contemplated travel of the vehicle, said rib being formed to provide trip projections proportionally spaced in accordance with contemplated spaced operations of the indicator, and means operated by the trip projections and directly connected to the cut-off for actuating the latter.

6. An operating means for air actuated station indicators including a cut-off for controlling the admission of air to such indicator, said means comprising a drum adapted for rotary and longitudinal movement during the travel of the vehicle, a series of trip projections on said drum spaced in accordance with contemplated operation of the indicator, and means to be actuated by the trip projections for operating the cut-off.

7. An operating means for air actuated station indicators including a cut-off for controlling the admission of air to such indicator, said means comprising a drum adapted for rotary and longitudinal movement during the travel of the vehicle, a series of trip projections on said drum spaced in accordance with contemplated operation of the indicator, a trip member to be operated by the trip projections, and an operating connection between the trip member and cut-off.

8. An operating means for air actuated station indicators including a cut-off for controlling the admission of air to such indicator, said means comprising a drum adapted for rotary and longitudinal movement during the travel of the vehicle, a series of trip projections on said drum spaced in accordance with contemplated operation of the indicator, a trip member to be operated by the trip projections, an operating connection between the trip member and cut-off, and means to return the trip member to normal position following trip-projection operation thereof.

9. A vehicle arranged for track travel, a station indicator thereon, a cut-off for controlling the admission of air to the indicator, a controlling drum having threaded connection with a fixture, means operated by the axle of the vehicle to continuously operate the drum during the movement of the vehicle, and a member carried by the cut-off and directly actuated by the drum for the periodic operation of the cut-off.

10. A vehicle arranged for track travel, a station indicator thereon, a cut-off for controlling the admission of air to the indicator, a controlling drum having threaded connection with a fixture, means operated by the axle of the vehicle to continuously operate the drum during the movement of the vehicle, the thread of the drum being interrupted to form trip projections, and cut-off operating means actuated by the trip projections.

11. A vehicle arranged for track travel, a station indicator thereon, a cut-off for controlling the admission of air to the indicator, a controlling drum having threaded connection with a fixture, means operated by the axle of the vehicle to continuously operate the drum during the movement of the vehicle, the thread of the drum being interrupted to form trip projections, the effective length of the drum thread bearing a definite proportion to the contemplated travel of the vehicle and the spacing between trip projections bearing a corresponding proportion to the distance between points at which the station indicator is to be operated, and cut-off operating means actuated by the trip projections.

12. A vehicle arranged for track travel, a station indicator thereon, a cut-off for controlling the admission of air to the indicator, a controlling drum having threaded connection with a fixture, means operated by the axle of the vehicle to continuously operate the drum during the movement of the vehicle, the thread of the drum being interrupted to form trip projections, and a cut-off operating trip member to be actuated by the trip projections.

13. A vehicle arranged for track travel, a station indicator thereon, a cut-off for controlling the admission of air to the indicator, a controlling drum having threaded connection with a fixture, means operated by the axle of the vehicle to continuously operate the drum during the movement of the vehicle, the thread of the drum being interrupted to form trip projections, a cut-off operating trip member to be actuated by the trip projections for operating the cut-off in one direction, and a weight for operating the trip member and thereby the cut-off in the opposite direction.

14. An operating means for cut-off control air-operated station indicators, comprising a drum having a surface indication formed to present a length proportional to the length of track between the terminal stations within the limits of the station indicator, the surface indication of the drum being formed at appropriate points with means to insure actuation of the cut-off control to thereby operate the station indicator, means for rotating the drum and at the same time moving the drum longitudinally to thereby present the surface indications successively at a particular point, and a cut-off carried member directly actuated by the drum.

15. A station indicator to be operated by compressed air, a cut-off for controlling the admission of air to such indicator, a drum formed with a helically arranged series of trip projections, a member carried by the cut-off and directly actuated by said trip projections in succession, means for moving the drum to successively present the trip projections in such predetermined position.

16. A station indicator to be operated by compressed air, a cut-off for controlling the admission of air to such indicator, a drum formed with a helically arranged series of trip porjections, a member carried by the cut-off and directly actuated by said trip projections in succession, means for moving the drum to successively present the trip projections in such predetermined position, and means for reversing the movement of the drum.

17. In combination with a passenger car, an air-operated station indicator therefor, a cut-off for controlling the air admission to the indicator, a drum adapted for rotary and axial movement, a member carried by the cut-off and directly actuated by the drum, and means operated by the car axle for operating the drum.

18. In combination with a passenger car, an air-operated station indicator therefor, a cut-off for controlling the air admission to the indicator, a drum adapted for rotary and axial movement, a member carried by the cut-off and directly actuated by the drum, and means operated by the car axle for operating the drum, said means being reversible to operate the drum in either direction at will.

In testimony whereof I affix my signature.

VICENTE PERALES GAMBOA.